United States Patent

[11] 3,619,681

| [72] | Inventors | Frank Ginkel;<br>Ernst Richard Ginkel, both of 502 West<br>Comstock Ave., Glendora, Calif. 91740 |
|---|---|---|
| [21] | Appl. No. | 41,794 |
| [22] | Filed | June 1, 1970 |
| [45] | Patented | Nov. 9, 1971 |

[54] ROTARY SEAL AND ROTARY ELECTRICAL COUPLING EMBODYING SAME
12 Claims, 6 Drawing Figs.

[52] U.S. Cl. .................................................. 310/232,
       277/94, 310/178, 339/5 L
[51] Int. Cl. .................................................. H01r 39/08
[50] Field of Search ......................................... 310/232,
       231, 219, 178, 119; 339/5 L; 277/59, 94, 61, 81,
       96

[56] References Cited
UNITED STATES PATENTS
2,705,654  4/1955  Saywell .......................... 277/94 X
2,716,223  8/1955  Griefen .......................... 310/219 UX
351,907  11/1886  Eickemeyer ................... 310/178
FOREIGN PATENTS
57,222  3/1925  Germany ....................... 310/178

Primary Examiner—D. F. Duggan
Assistant Examiner—B. A. Reynolds
Attorney—Boniard I. Brown ABSTRACT: A rotary seal assembly having relatively rotatable inner and outer members and a number of sheet thin, laterally resilient, radially inner and outer sealing discs surrounding the inner member within an annular clearance space between the members. The inner and outer discs are secured and sealed to the inner and outer members, respectively, and have radially overlapping circumferential portions which bear yieldably against one another to form a fluid seal between the members. A viscous slipring construction embodying the rotary seal assembly.

PATENTED NOV 9 1971
3,619,681
SHEET 1 OF 2
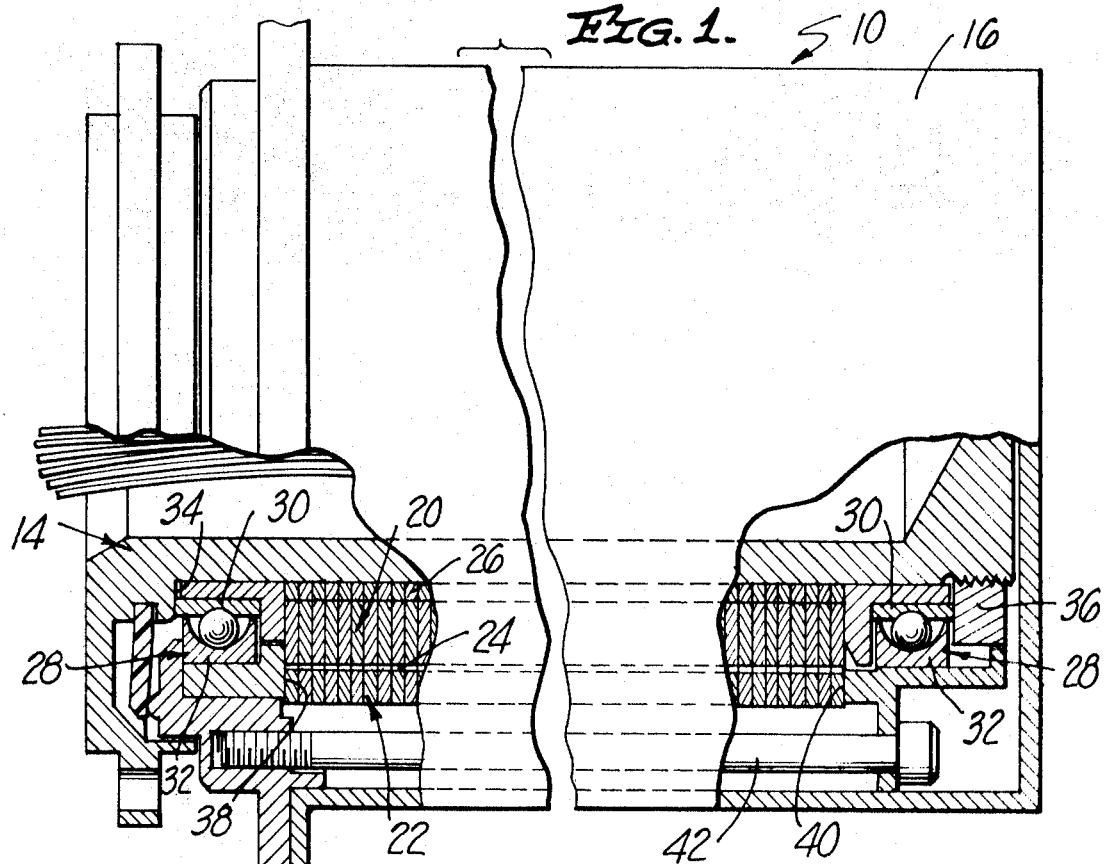
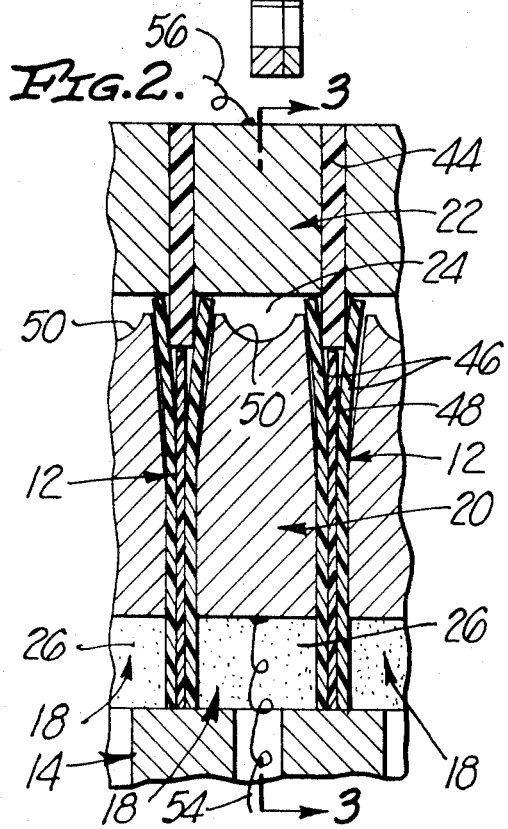
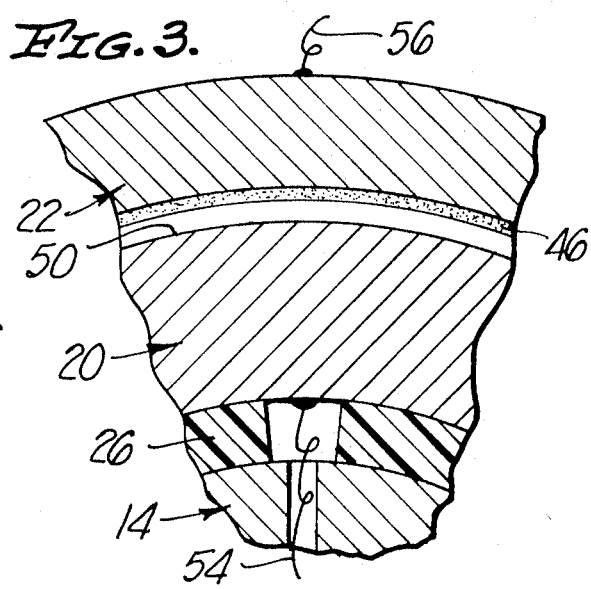
INVENTORS
FRANK GINKEL,
ERNST RICHARD GINKEL
BY
Bernard J. Brown
ATTORNEY

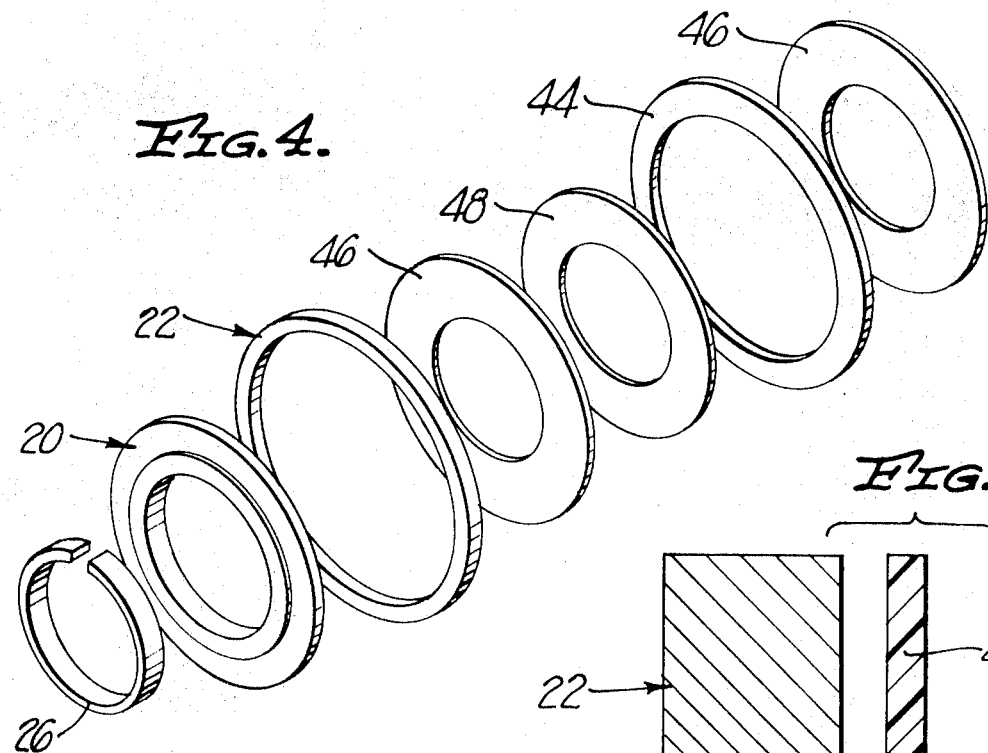
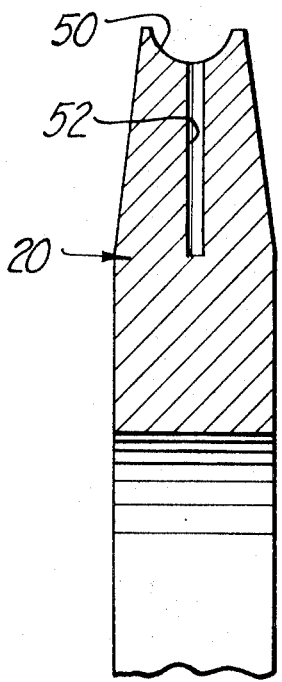
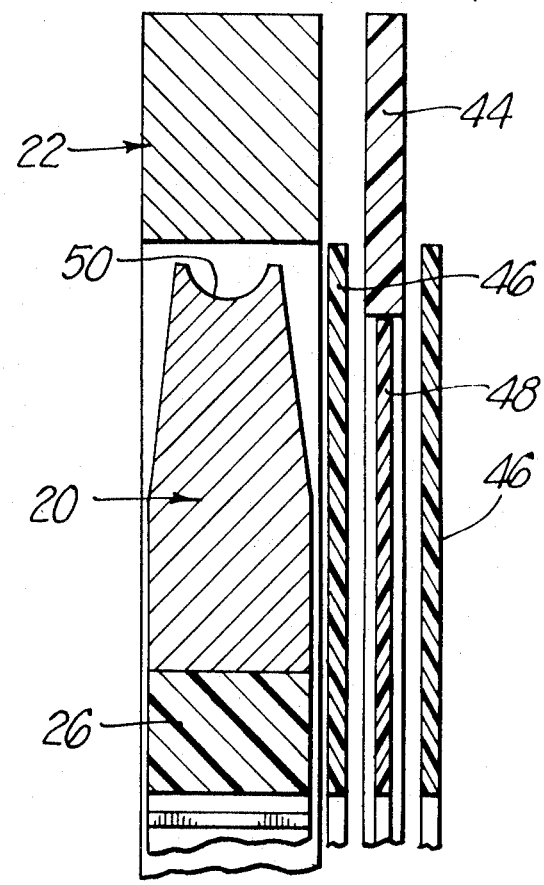
INVENTORS
FRANK GINKEL,
ERNST RICHARD GINKEL
BY
Boniard I. Brown
ATTORNEY

ROTARY SEAL AND ROTARY ELECTRICAL COUPLING EMBODYING SAME

BACKGROUND OF THE INVENTION

Field of the Invention

This invention relates generally to the field of rotary fluid and electrical devices. More particularly, the invention relates to a rotary fluid seal assembly and to a viscous rotary electrical conductor or viscous electrical slipring construction embodying the seal assembly.

Prior Art

One aspect of the present invention is concerned with a rotary fluid seal assembly for providing a fluid seal between relatively rotating members, such as a rotor and a surrounding stator. The primary application of this seal assembly, however, is in a so-called viscous rotary electrical conductor or slip ring. For this reason, the invention will be described in connection with its use in a viscous electrical slipring construction.

Sliprings are used to transmit electrical current between relatively rotating parts. A conventional slipring unit consists of carbon brushes riding a conducting ring. In instrumental use, brushes and rings make use of gold and silver in order to conduct very weak electrical impulses or signals. One major disadvantage of such sliprings is that dust generated by wear makes frequent replacement of the brushes and cleaning of the sliprings a necessity. 'Down time' for such cleaning and replacement is extremely costly. These disadvantages of brush sliprings are avoided in so-called viscous electrical couplings or sliprings employing mercury. Continuous electrical contact is made in such a unit through use of a copper disc which replaces the conventional slipring, an outer ring, and the mercury medium which contacts the disc and ring. Electrical resistance is far lower than in brush sliprings and has far greater stability. This eliminates the need for the extreme rotational speeds resorted to in conventional units to minimize transmission fluctuations. Additionally, even minute signals can be transmitted prior to amplification.

While viscous sliprings are superior in many respects to brush sliprings, they present certain problems. One of these problems involves sealing the liquid mercury in each slipring current channel from those adjacent to it. This is accomplished in existent mercury couplings with elaborate and space-consuming seals. Such constructions have practical miniaturization limits of approximately 0.280 inches per channel—0.500 inches is a more common figure. As a consequence, viscous sliprings have not yet replaced conventional sliprings in airborne systems in spite of their advantages since size and weight limitations are generally more critical.

SUMMARY OF THE INVENTION

The present invention provides an improved viscous rotary electrical conductor or slipring construction which avoids the above and other problems encountered with the existing viscous sliprings. The invention also provides a novel seal assembly for the slipring construction and other uses.

The present viscous slipring construction comprises one or more pairs of concentric, relatively rotatable, radially inner and outer electrical conductors or conductor rings disposed one within the other and defining an intervening annular clearance space for containing an electrically conductive fluid medium, such as mercury. This conductive medium contacts and conveys electrical current between the inner and outer conductor rings during their relative rotation.

At each side of each pair of concentric conductor rings, and hence between each adjacent set of conductor ring pairs in a slipring construction embodying a number of ring pairs, or current channels, arranged side by side, is a seal assembly according to the invention. In a single channel slipring construction, the seal assemblies serve primarily to retain the mercury in the channel. In a multiple channel slipring construction, the seal assemblies serve this function as well as preventing short circuit contact of the mercury in adjacent channels.

The present seal assembly includes a set of radially overlapping sheet thin sealing discs which are secured and sealed to the relatively rotatable members between which a fluid seal is desired, such as the inner and outer conductor rings of the present viscous slipring construction. The overlapping portions of the discs bear yieldably against one another in such a manner as to form an effective fluid seal between the discs. According to the preferred practice of the invention, the sealing discs are constructed of sheet plastic, such as Teflon or Mylar. Important features of the invention are concerned with the arrangement of the sealing discs whereby the latter are retained in sealing contact by internal elastic strain energy to form a seal. Primary advantages of the present viscous slipring construction and seal assembly reside in their relatively lightweight, compact size, and adaptability to miniaturization.

BRIEF DESCRIPTION OF THE DRAWINGS

FIG. 1 illustrates a multiple channel viscous rotary electrical conductor or slipring construction according to the invention;

FIG. 2 is a fragmentary enlargement of a portion of three adjacent channels of the slipring construction;

FIG. 3 is a section taken on line 3—3 in FIG. 2;

FIG. 4 is an exploded perspective view of the slipring construction,

FIG. 5 is an enlarged fragmentary section through one channel and seal assembly of the slipring construction; and FIG. 6 illustrates a modified inner conductor ring or rotor disc for the present slipring construction.

DESCRIPTION OF THE PREFERRED EMBODIMENT

The drawings illustrate a multiple channel viscous rotary electrical conductor or slipring construction 10 according to the invention embodying a number of the present rotary seal assemblies 12. The illustrated slipring construction includes an inner generally tubular rotor member 14 concentrically surrounded by an outer generally cylindrical stator member 16. Each channel 18 of the construction has radially inner and outer electrical conductors 20, 22, or conductor rings concentrically disposed one within the other so as to define an intervening annular space 24 for containing an electrically conductive fluid medium, such as mercury. The several sets of conductor ring pairs 20, 22 which constitute the slipring channels 18 are coaxially arranged side by side along a common axis, i.e., the axis of the rotor 14 and stator 16. The fluid seal assemblies 12 are interposed between the adjacent channels to prevent leak of mercury between and thereby short circuiting of the adjacent channels.

In the particular inventive embodiment selected for illustration, the inner conductor rings 20 are coaxially disposed side by side along and surround the rotor 14. Press fitted or otherwise fixed within each inner ring 20 is an insulating ring 26 which is slidably fitted on the rotor 14. The outer conductor rings 22 are coaxially disposed side by side within the stator 16. The rotor 14 is rotatably supported within the stator 16 by roller bearings 28 having radially inner and outer races 30, 32. The inner conductor rings 20 and insulating rings 26 are arranged in a stack between the inner bearing races 30 which are confined between a shoulder 34 and a nut 36 on the rotor 14. The nut 36 is tightened to firmly clamp the inner rings together. The outer conductor rings 22 are arranged in a stack between confronting shoulders 38, 40 on the stator 16. The stator is equipped with bolts 42 (only one shown) which are tightened to draw the shoulders 38, 40 toward one another and thereby firmly clamp the outer conductor rings 22 together.

Referring particularly to FIGS. 2–5, each seal assembly 12 comprises an outer annular sealing disc 44, a pair of inner annular sealing discs 46, and an annular spacing disc 48. The outer circumferential portion of the outer sealing disc 44 is interposed and clamped firmly between the adjacent outer conductor rings 22. The inner circumferential portions of the inner sealing discs 46 and the spacing discs 48 are interposed and clamped firmly between the adjacent inner conductor rings 20 and insulating rings 26. As shown best in FIG. 2, the outer circumferential portions of the inner sealing discs 46 radially overlap and straddle the inner circumferential portion of the outer sealing disc 44. These overlapping disc portions bear yieldably against one another to form a fluid seal, or more correctly two fluid seals, between the discs.

The manner in which the sealing discs 44, 46 are relating in fluid-sealing contact constitutes an important feature of the invention. According to this feature, the sealing discs 46 are constructed of sheet thin electrical insulating material, such as Teflon, Mylar, or other plastic, which has an elastic memory. The outer sealing discs 44 may be constructed of the same type of material but may be somewhat thicker than the inner discs, as shown. In a typical viscous slipring construction according to the invention, for example, the outer sealing disc may be on the order of 0.015-inches thick and the two inner sealing discs may be on the order of 0.0075-inches thick. The inner sealing discs 46 are formed in such a way that they are flat in their normal unstressed condition. The fixed inner circumferential portions of the inner discs 46 are spaced a distance less than the thickness of the outer sealing disc 44. Accordingly, the outer portions of the inner sealing discs are deflected laterally away from one another by the outer sealing disc, as shown in FIG. 2. This creates elastic strain force in the inner discs which yieldably retains them in sealing contact with the outer disc. To this end, the spacing disc 48 between the two inner sealing discs 46 has a thickness less than the outer sealing disc 44. This spacing disc may be eliminated, if desired.

In order to provide clearance for the arcuately deformed portions of the inner sealing discs 46, the sides of the inner conductor rings 20 converge toward the outer edge of the rings to provide the latter with a tapered cross section. This is necessary to prevent the sealing discs from being squeezed between the inner conductor rings into gripping relation with the outer sealing discs 44 which would lock the rotor 14 against turning or at least produce excessive disc wear.

Each inner conductor ring 20 has a circumferential groove 50 which provides increased electrical contact area between the conductor rings and mercury. If desirable, each inner ring may have a bore or passage 52 (FIG. 6) to accommodate thermal expansion of the mercury. In this regard, the source of heat in larger rotary conductors of this type is mainly seal friction. Or, the environment in which the slipring is to be used may present higher temperatures. In most applications leaving a portion of space 24 unfilled with mercury (allowing for this thermal expansion) will suffice. It is desirable to purge the portion of space 24 left unfilled with mercury with a relatively inert gas such as nitrogen in order to prevent the oxidation of Hg which would otherwise occur, particularly at higher temperatures. Each slipring channel 18 has a pair of electrical terminals 54, 56. Terminal 54 is connected to the respective inner conductor ring 20 through openings in the rotor 14 and respective insulator ring 26. Terminal 56 is connected to the corresponding outer conductor ring 22.

During operation of the present viscous slipring construction, the rotor 14 turns within the stator 16. The inner conductor rings 20 rotate in unison with the rotor and relative to the outer conductor rings 22 which remain stationary with the stator. The mercury within the annular space 24 of each slipring channel 18 remains in electrical contact with both of the respective conductor rings 20, 22 during this rotation to convey electrical current between the rings. The seal assemblies 12 prevent leakage of mercury between adjacent channels 18 and short circuit contact of mercury within adjacent channels. In this regard, it is evident that centrifugal force pressurizes the mercury within each channel and this static pressure aids in retaining the adjacent inner sealing discs 46 in sealing contact with their outer sealing discs 44. Thus, the mercury pressure within each channel resists leakage into the channel of mercury from an adjacent channel. This action occurs at each of the two sealing regions of each seal assembly 12, whereby short circuit contact of mercury in two adjacent slipring channels is prevented.

If desirable, the relative positions of inner and outer sealing discs 46, 44 may be reversed without changing the principles by which sealing is accomplished. An advantage of the sealing arrangement is that the only slidable rotation between solid materials (other than the bearings, of course) is plastic seal 44 against plastic seal 46. This is particularly beneficial in rotary conductor applications. It is evident that the force with which the sealing discs bears against one another can be changed by using seals of different thickness, different thickness of spacers, plastics of differing flexibility, etc.

We claim:

1. A viscous electrical slipring construction comprising:
generally concentric relatively rotatable radially inner and outer electrical conductors defining an intervening annular clearance space to contain an electrically conductive fluid medium such as mercury for conducting electrical current between said conductors during relative rotation of said conductors, and
a rotary seal assembly at each side of said conductors including a pair of annular sheet thin laterally resilient radially inner and outer sealing discs, means securing and sealing the inner circumferential portion of said inner disc to the adjacent side of said inner conductor, means securing and sealing the outer circumferential portion of said outer disc to the adjacent side of said outer conductor, and said discs having radially overlapping circumferential portions which bear yieldably against one another to form a fluid seal between said conductors.

2. A slipring construction according to claim 1 wherein:
said discs are substantially flat in their normal unstressed condition, and
the inner circumference of said inner disc and the outer circumference of said outer disc are disposed in overlapping planes, whereby at least one disc is deflected laterally by the other disc to effect resilient fluid-sealing engagement of said discs.

3. A slipring construction according to claim 1 wherein:
said conductors are rings having side faces, and
said disc securing and sealing means comprise means clamping said discs against the adjacent side faces of their respective conductor rings.

4. A viscous electrical slipring construction comprising:
generally concentric relatively rotatable radially inner and outer electrical conductors defining an intervening annular clearance space to contain an electrically conductive fluid medium such as mercury for conducting electrical current between said conductors during relative rotation of said conductors,
a rotary seal assembly at each side of said conductors including a set of annular sheet thin laterally resilient sealing discs at each side of said conductors including a first disc and a pair of second discs straddling said first disc, said first disc and said second discs having circumferential portions disposed in radially overlapping relation in the region between said conductors, said first disc having a remaining circumferential portion adjacent one conductor, and said second discs having remaining circumferential portions adjacent the other conductor,
means securing and sealing said remaining circumferential portion of said first disc to the adjacent conductor,
means securing and sealing said remaining circumferential portions of said second discs to the adjacent member, and
said overlapping disc portions bearing yieldably against one another to form a pair of fluid seals between said discs.

5. A slip ring construction according to claim 4 wherein:
said discs are substantially flat in their normal unstressed condition, and
the spacing between said remaining circumferential portions of said second discs is less than the thickness of said first disc, whereby said second discs are deflected laterally away from one another by said first disc to create in said second discs elastic strain force which yieldably retains said overlapping disc portions in mutual sealing contact.

6. A slipring construction according to claim 5 wherein:
a spacing disc of lesser thickness than said first disc interposed between said corresponding circumferential portions of said second discs.

7. A slipring construction according to claim 4 wherein:
said first disc is secured to said outer conductor and said second discs are secured to said inner conductor.

8. A slipring construction according to claim 4 wherein:
said conductors are rings having side faces, and
said disc securing and sealing means comprise means clamping said discs against the adjacent side faces of their respective conductor rings.

9. A viscous electrical slipring construction comprising
a number of coaxial conductor ring pairs disposed side by side along a common axis each including generally concentric relatively rotatable radially inner and outer electrical conductor rings defining an intervening annular clearance space to contain an electrically conductive fluid medium such as mercury for conducting electrical current between the rings during relative rotation of said rings,
a rotary seal assembly between the adjacent conductor ring pairs including a radially outer sealing disc having its outer circumferential portion interposed between the respective adjacent outer conductor rings and a pair of radially inner sealing discs having their radially inner circumferential portions interposed between the respective adjacent inner conductor rings, and the outer circumferential portions of said inner discs being disposed straddling radially overlapping relation with the inner circumferential portion of said outer disc,
means clamping the adjacent inner conductor rings and the adjacent outer conductor rings together, thereby to secure and seal each outer sealing disc to the adjacent outer conductor rings and each pair of inner sealing discs to the adjacent inner conductor rings, and the overlapping sealing disc portions of each seal assembly bearing yieldably against one another to form a rotary fluid seal between the discs.

10. A slipring construction according to claim 9 wherein:
said sealing discs are substantially flat in their normal unstressed condition, and
the spacing between the inner circumferential portions of each pair of inner sealing discs is less than the thickness of the respective outer sealing disc whereby the outer portions of each pair of inner discs are deflected laterally away from one another by the intervening outer disc to create in the inner discs elastic strain force which yieldably retains the overlapping disc portions in sealing contact.

11. A slipring construction according to claim 10 including:
a spacing disc interposed between the inner circumferential portions of each pair of inner sealing discs and having a thickness less than the respective outer sealing disc.

12. A slipring construction according to claim 9 including:
a rotor extending through and supporting said inner conductor rings, a stator supporting said outer conductor rings, and bearings rotatably supporting said rotor in said stator for turning on said common axis.

* * * * *